United States Patent [19]

Syska

[11] 4,116,611
[45] Sep. 26, 1978

[54] GASEOUS AND LIQUID FUEL BURNER

[75] Inventor: Andrew J. Syska, Marblehead, Mass.

[73] Assignee: Consolidated Natural Gas Service Company, Pittsburgh, Pa.

[21] Appl. No.: 719,428

[22] Filed: Sep. 1, 1976

[51] Int. Cl.² .......................................... F23D 15/02
[52] U.S. Cl. .................................... 431/353; 431/186; 431/347
[58] Field of Search ............. 431/173, 353, 158, 160, 431/174, 8, 9, 284, 285, 347, 186

[56] References Cited

U.S. PATENT DOCUMENTS

| | | | |
|---|---|---|---|
| 2,438,996 | 4/1948 | Greene | 431/347 |
| 2,831,535 | 4/1958 | Lange | 431/186 |
| 2,863,500 | 12/1958 | Schumann | 431/285 X |
| 2,989,119 | 6/1961 | Burt | 431/353 |
| 3,190,823 | 6/1965 | Bloxham | 431/353 X |
| 3,244,220 | 4/1966 | Kloecker | 431/284 X |
| 3,344,834 | 10/1967 | Feinman et al. | 431/353 |
| 3,676,048 | 7/1972 | Sellors, Jr. et al. | 431/353 |

*Primary Examiner*—Edward G. Favors
*Attorney, Agent, or Firm*—Fish & Neave

[57] ABSTRACT

A improved burner for metallurgical furnaces capable of utilizing gaseous or liquid fuels and air, enriched air or oxygen as an oxidant and adapted to accommodate rich fuel/oxidant mixtures is disclosed. The burner is capable of producing high temperatures and a reducing and non-decarburizing atmosphere without causing carbonization or other fouling of the burner or related furnace and without damaging the burner.

7 Claims, 5 Drawing Figures

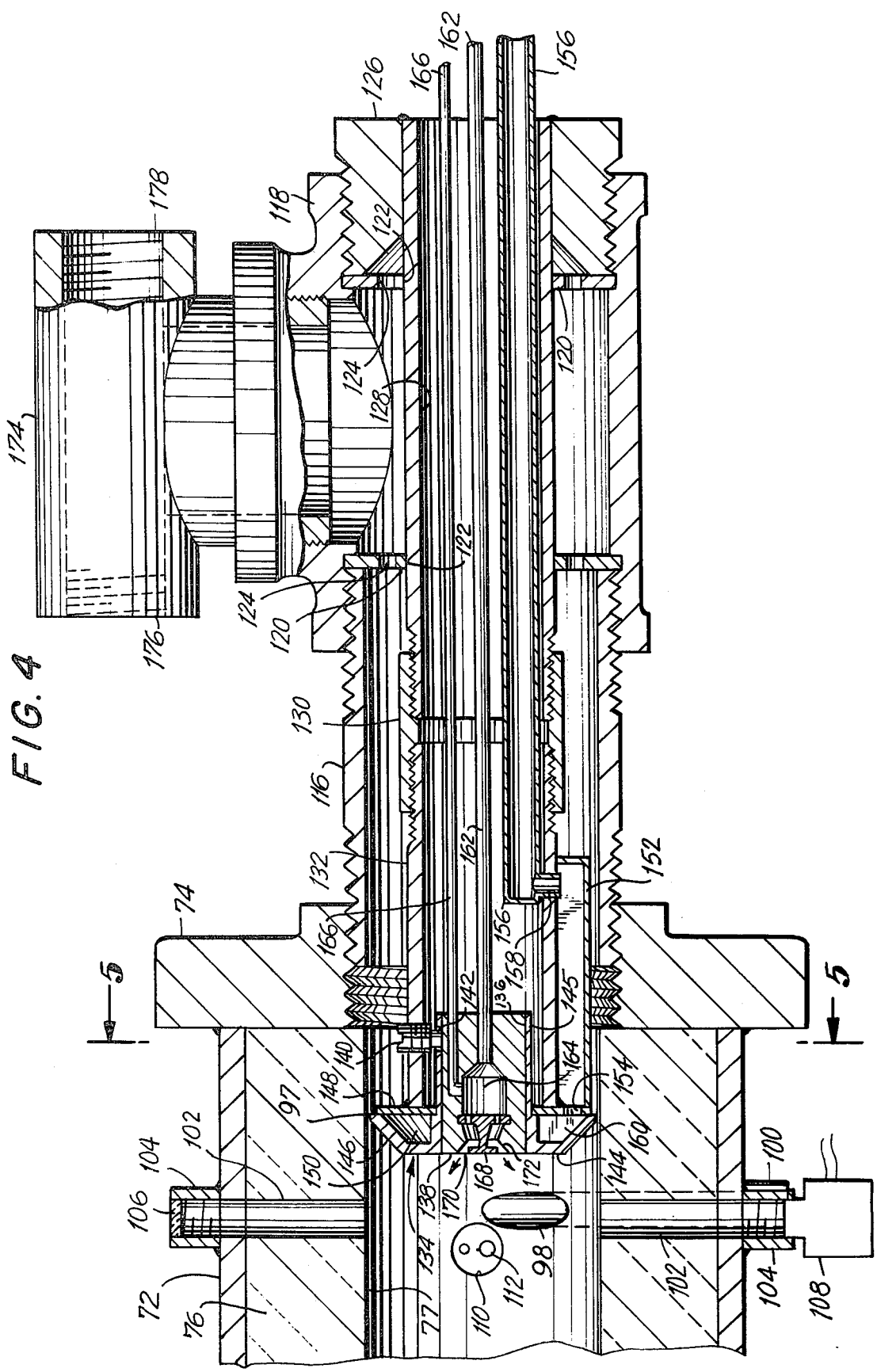

GASEOUS AND LIQUID FUEL BURNER

BACKGROUND OF THE INVENTION

1. Field of the Invention

This invention relates generally to liquid and gaseous fuel burners intended for use in conjunction with metallurgical furnaces. More particularly, the invention relates to burners adapted to operate efficiently on very rich fuel/oxidant ratios utilizing either air or oxygen as the oxidizing agent with a gaseous or liquid fuel.

In the performance of metallurgical processes such as the smelting and refining of iron and steel, annealing, or other heat treating it is necessary to provide large quantities of heat at relatively high temperatures to a charge of ore or a melt of hot metal or steel. Frequently it is also necessary to provide a protective atmosphere for the process. Due to the high cost of fuels generally and the current scarcity of natural gas as a fuel, it is desirable to utilize burners capable of operating efficiently on either gaseous fuels, usually natural gas or methane, or liquid fuels such as fuel oil. Further to increase the efficiency of the operation, it is desirable to provide a burner which can use either air or oxygen as the oxidizer. With respect to the latter matter, it will be appreciated that nitrogen comprising approximately 80 percent of the atmospheric air is inert and constitutes a burden which represents a substantial heat loss in the form of the sensible heat in the exhaust gases from a metallurgical process. While this loss may be minimized by substituting oxygen or oxygen-enriched air for the atmospheric air normally used for combustion purposes, the result may be to increase the flame temperature in the burner to a point where the refractory materials adjacent the burner, or the burner itself, may be damaged or the useful life thereof shortened substantially. One aspect of the present invention is directed to a burner capable of producing a luminous flame with a concomitant high rate of radiant heat transfer but which will not result in damage or injury to the refractory areas surrounding the burner or portions of the burner itself. Another aspect of the invention is directed toward a burner construction capable of operating with very rich fuel/oxidant ratios including ratios down to 50% oxygen for stoichiometric reaction, using air, enriched air, or oxygen as the oxidizer. Still another aspect of the invention is directed to a burner capable of producing a reducing and non-decarburizing atmosphere within the furnace.

It is also important in the operation of metallurgical or other processes requiring the addition of heat to provide a burner design which is simple and durable and relatively insensitive to variations in quality of the fuel supply. Moreover, the burner should not be susceptible to carbonization or other fouling even at rich fuel/oxidant ratios. The present invention is also directed to these ends.

2. Description of the Prior Art

The art has developed a large number of specialized burners designed in accordance with various theories and intended to increase the efficiency of combustion. For example, in Bansen, U.S. Pat. No. 1,656,907, a series of jets of gaseous fuel and air are impinged normally to each other, one series of jets directed axially of the burners and the other series of jets directed tangentially to produce a generally helical flow of the mixture in a mixing chamber. According to Bansen, the flame is formed in a comparitively short zone. In constrast, Peczeli, U.S. Pat. No. 3,576,384 discloses a liquid fuel burner of the vortex type wherein atomized fuel is delivered to the combustion chamber in an axial direction while the combustion air, after passing through a vortex chamber, is directed into the combustion chamber through a series of concentric converging nozzles. According to Peczeli, the use of concentric converging nozzles avoids carbonization of the burner by minimizing the reverse flow of hot combustion gases in the core or axis of the burner.

Another form of vortex burner adaptable to either liquid or gaseous fuels is shown in Shular, U.S. Pat. No. 3,748,087 wherein the gaseous or liquid fuel is delivered axially to a shaped flame tunnel while the combustion air passes through a vortex chamber prior to mixing with the fuel at the entrance to the flame tunnel. The Shular patent teaches that a very lean fuel/air mixture may be employed. A somewhat similar arrangement is shown in Wang, et al. U.S. Pat. No. 3,809,525 wherein a vortex type burner is arranged to develop a flat flame.

Finally, Reed et al., U.S. Pat. No. 3,857,672 illustrates a so-called "tri-fuel" burner wherein a liquid or gaseous fuel is burned in an axial burner with an excess of air, a gaseous fuel is introduced tangentially downstream from the axial burner, and a lean gaseous fuel is introduced tangentially still further downstream from the axial burner.

It is, of course, well known to employ gas generators for metallurgical processes requiring protective atmospheres, such as a reducing atmosphere. Thus, for example, an atmosphere containing 40% hydrogen, 40% nitrogen and 20% carbon monoxide can be produced by an externally heated retort filled with a catalyst and having an appropriate gas ratio, temperature controls, etc. Similar atmospheres can be produced with ammonia dissociators. However, such equipment is complex and expensive to build and operate.

SUMMARY OF THE INVENTION

The present invention is directed to a simple and rugged burner construction capable of fabrication largely from standard parts and designed for operation using rich fuel/oxidant ratios with either air or oxygen as the oxidizer and gaseous or liquid fuel as the fuel. A cylindrical mixing and combustion chamber is formed from a castable refractory. One end of the mixing and combustion chamber is fitted with burner disc which defines an uninterrupted annular passage for the oxidizer adjacent the wall of the combustion chamber. When gaseous fuel is used, the fuel is introduced into the mixing and combustion chamber downstream from the burner disc while when liquid fuel is used it is introduced axially through the burner disc. The use of a burner disc with a tangential gas inlet arrangement ensures mixing sufficient to generate the required high temperatures but limits those temperatures below the point at which damage to the stainless steel or ceramic burner disc would occur. When liquid fuels are used, a flame of greater luminosity and emissivity is produced thus necessitating the provision of additional cooling for the burner disc beyond that resulting from the passage of the oxidant around the flame holder.

In accordance with the present invention, the maximum flame temperatures occur in a central region of the mixing and combustion chamber at a maximum distance from the refractory walls whereby damage to the refractory is avoided.

The burner of the present invention is particularly adapted for use in conjunction with a cupola and direct reduction process where it is desirable to maintain a reducing atmosphere within the cupola. Through proper control of the fuel-oxidant mixture to produce a very rich fuel/oxidant ratio, an efficient luminous flame can be produced while maintaining a reducing and non-decarburizing atmosphere downstream from the combustion chamber of the burner. The high fuel/oxidant ratio used in accordance with the present invention results in products of combustion containing high concentrations of hydrogen and carbon monoxide and producing temperatures in excess of 3200° F. The use of such fuel/oxidant ratios ordinarily tends to result in rapid carbonization of the burner assembly; slower reaction rates and, sometimes, arrest of the process. In the present invention, carbonization is avoided due to the homogeneous mixing of the reactants within the combustion chamber. Of course, the burner of the present invention is not limited to operation with a cupola and may be used in other metallurgical or chemical processes where it is necessary to introduce heat to the process.

Further features of the invention will appear in the following detailed description of the invention taken in conjunction with the accompanying drawings in which:

FIG. 4 is a vertical cross section of a burner in accordance with the present invention capable of using gaseous or liquid fuel and air, enriched air or oxygen as the oxidizer.

DETAILED DESCRIPTION OF THE INVENTION

Figure 1:
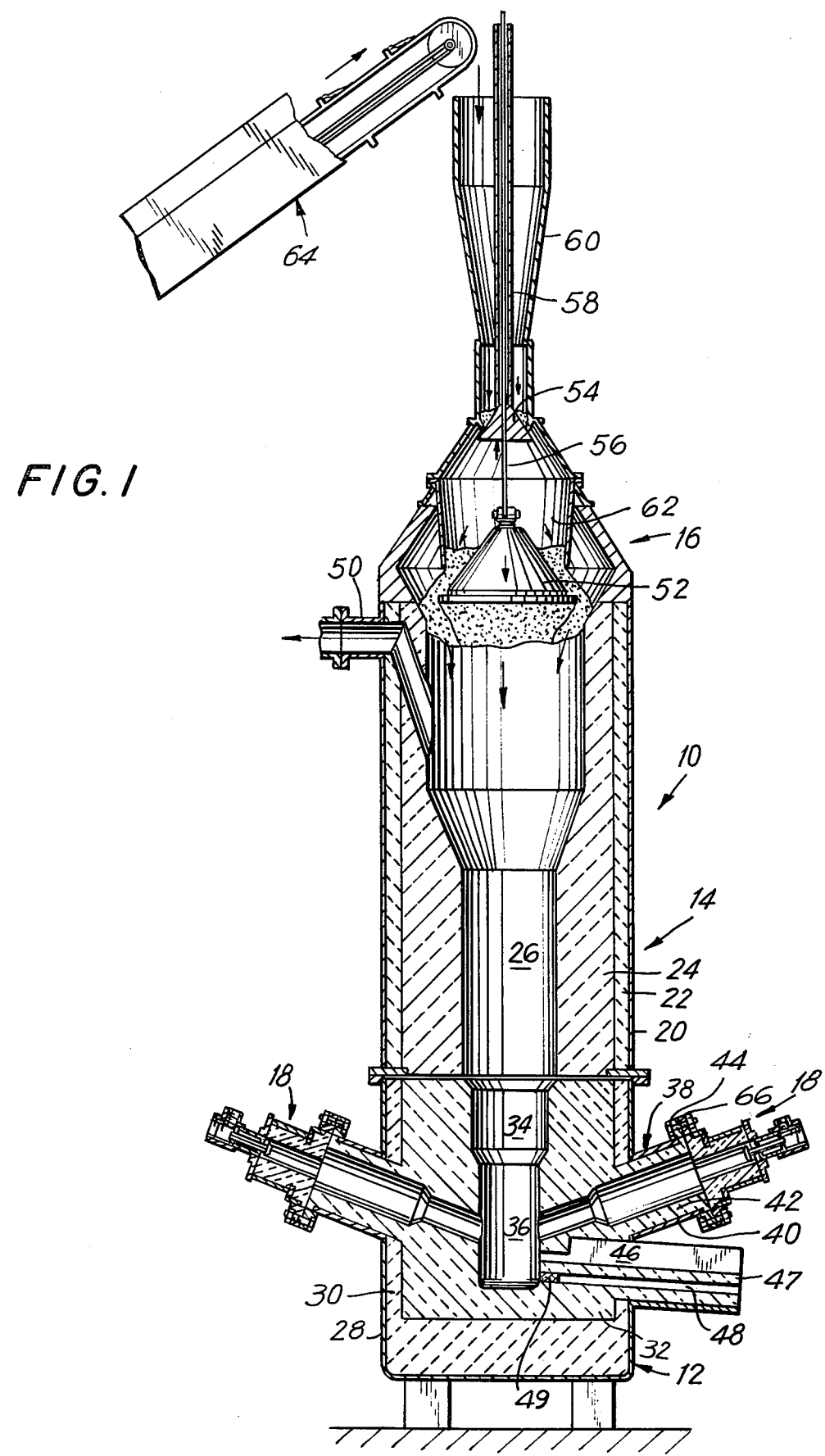
FIG. 1 is a vertical cross section in schematic form of a cupola melting furnace incorporating a plurality of burners made in accordance with the present invention.

Referring now to the drawings and particularly to FIG. 1, a cupola-type melting furnace is indicated generally at 10. The furnace comprises a hearth portion 12, a body portion 14 and a top portion 16. A plurality of burners 18 in accordance with the present invention may be located in the hearth portion 12 of the furnace 10.

The body of the cupola furnace 10 comprises a cylindrical steel shell 20 containing a permanent lining 22 of refractory material. A working lining 24 is constructed within the permanent lining 22 defining an open shaft 26 adapted to receive the cupola charge. Similarly, the hearth portion 12 of the furnace 10 comprises an outer steel shell 28, a permanent lining 30 of refractory material and a working lining 32 shaped to define a suspended melting zone 34 and a hearth zone 36. The hearth shell 28 is fitted with series of burner adapters 38 comprising an outer cylindrical steel shell 40 lined with an annular refractory material 42 and terminating on the outward end in a flange fitting 44 designed to receive the burners 18. Intermediate a pair of the burner adapters 38 and communicating with the hearth 36 slightly above the bottom thereof is a spout 46 lined with refractory material 47. A drain spout 48 also lined with refractory material communicates with the bottom of the hearth. The spout 48 is normally closed by a clay plug 49.

Near the top of the body portion 14 of the furnace 10 is an outlet duct 50 through which the gases from the furnace may be exhausted or directed into further processing equipment.

The top portion 16 of the furnace 10 preferably comprises a sealed charging device adapted to prevent the discharge of exhaust gases therethrough. As shown in exemplary form in FIG. 1, the charging device includes a lower bell 52 and an upper bell 54 respectively separately controlled by shaft 56 and concentric tube 58 from appropriate manipulating means (not shown). The upper bell 54 serves to close the lower end of a generally cylindrical upper charge hopper 60 and forms the top of the intermediate charge hopper 62. The intermediate charge hopper 62 is also generally cylindrical in shape and is closed at its lower end by the lower bell 52. A conveyor 64 or equivalent means may be provided to deliver the charge materials to the furnace.

Typically, the furnace charge may comprise a mixture of iron and steel scrap and pre-reduced ore which, when melted will produce a hot metal having a carbon content in the vicinity of 1 to 3 percent and a temperature between 2400° and 2800° F. The burners according to the present invention are particularly adapted for use in a cupola furnace of the type shown in FIG. 1 where it is desirable to maintain a reducing and non-decarburizing atmosphere within the furnace.

Figure 2:
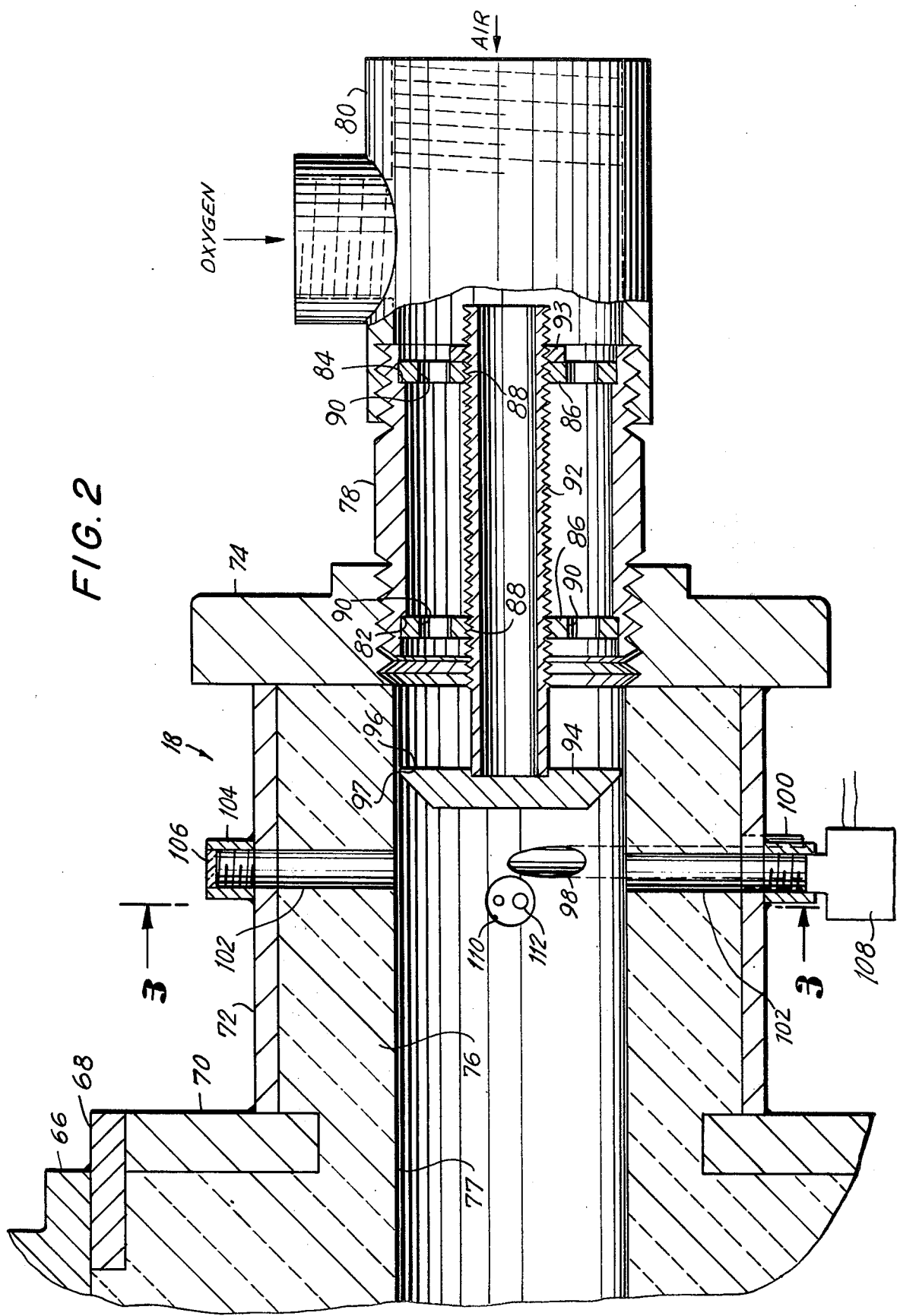
FIG. 2 is a vertical cross section on a larger scale of a burner in accordance with the present invention adapted for use with a gaseous fuel.

Referring now to FIG. 2, the gaseous fuel burner of the present invention comprises a flange 66 sized to mate with flange 44 on the burner adapters 38 (FIG. 1). Flange 66 is a standard pipe flange to which may be welded a short pipe section 68. A smaller standard flange 70 is welded into the inside of the pipe section 68 and carries welded on its outboard face a second pipe section 72 of smaller diameter. To the open end of the pipe section 72 is welded a threaded flange 74. A castable refractory 76 may be formed within the weldment comprising the flanges 66, 70 and 74 and the intermediate pipe sections 68 and 72. One face of the refractory 76 is formed to be flush with the open surface of the flange 66 while the central portion of the refractory 76 contains a bore 77 concentric with the threaded portion of the flange 74. The flange 70 contains a bore intermediate in diameter between the inside diameter of the pipe section 72 and the diameter of the threaded portion of the threaded flange 74 to provide means for retaining the castable refractory 76 within the burner 18.

Extending outwardly from the threaded flange 74 is a coupling or nipple 78 the free end of which carries a tee section 80. The ends of the coupling 78 are counterbored to form shoulders 82 and 84. Circular plates 86 affixed within the coupling 78 adjacent the shoulders 82 and 84 are provided with threaded central orifices 88 and series of circumferential apertures 90. A threaded tube 92 engages the threaded orifices 88 of the circular plates 86. A lock nut 93 may be positioned on the threaded tube 92 adjacent the outboard end thereof and one of the circular plates 86 to lock the burner disc 94 in the desired position relative to the gas inlet ports 98 described below. If a lock nut 93 is provided as described above, the central orifice 88 of the plate 86 adjacent the lock nut 93 may be unthreaded. One end of the threaded tube 92 carries a burner disc 94. The burner disc 94 is circular in shape and chamfered around the periphery thereof to define a narrow rim 96 adjacent the face to which the threaded tube 92 is affixed. The diameter of the burner disc 94 is smaller than the diameter of the refractory bore 77 so as to define a continuous annular opening 97 therebetween for the passage of a gaseous oxidizer therethrough.

Figure 3:
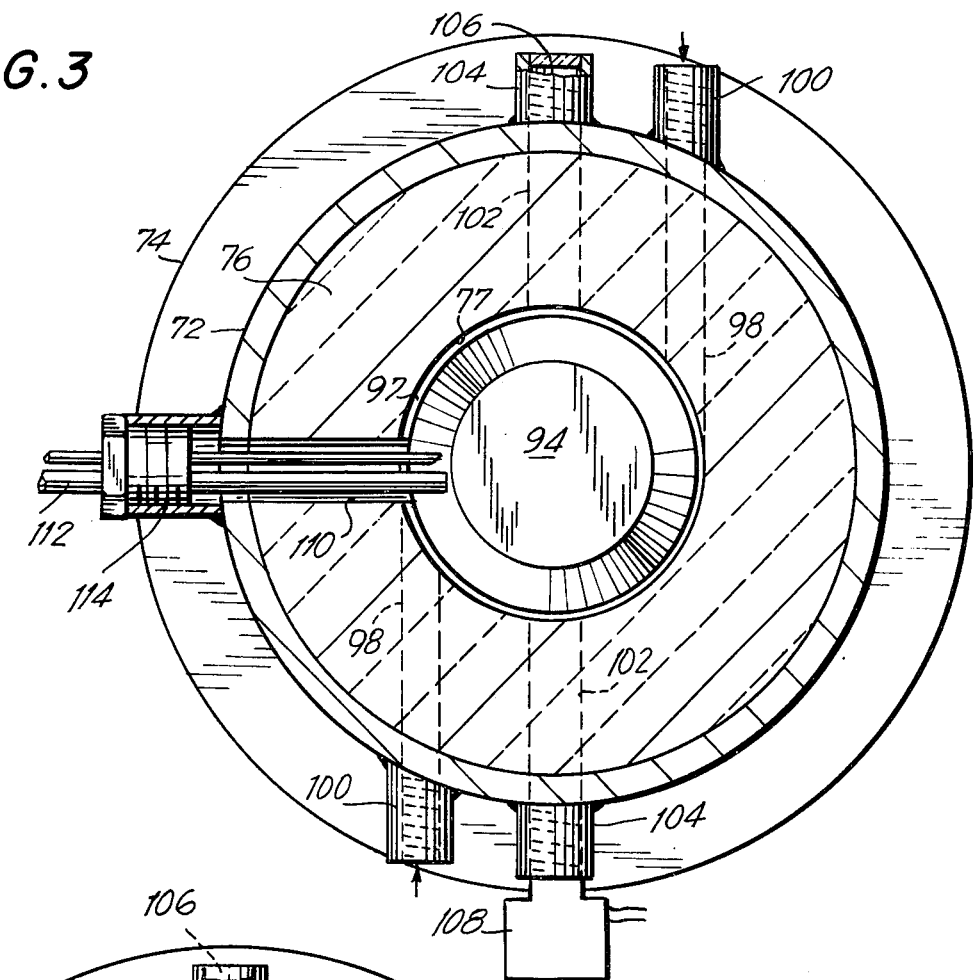
FIG. 3 is a sectional view taken along line 3—3 of FIG. 2.

A pair of transverse ports 98 are formed through the pipe section 72 and refractory 76 so as to be substantially tangential to the bore 77 within the castable refractory (FIG. 3). Preferably, the ports 98 extend from opposite sides of the pipe 72. A threaded coupling 100 is affixed to the pipe section 72 concentric with each port 98 to provide a connection from a gaseous fuel source. While a pair of ports 98 have been shown and described, additional ports may be provided as desired. The ports 98 are located toward the flange 66 from the burner disc 94 a distance approximately one quarter the diameter of the bore 77.

Slightly downstream from the ports 98 and on a diameter of the pipe section 72 are positioned a second set of ports 102. Threaded couplings 104 are affixed to the pipe 72 concentric with the ports 102, one of which may carry a peep sight 106 while the other is adapted to mount an ultraviolet detector 108.

A third port 110 is formed radially through the pipe 72 and refractory 76 in a plane adjacent to the plane of the ports 98 to receive a pilot burner assembly 112 or other ignition sources which is secured in place within a threaded coupling 114 affixed to the pipe 72 concentric with the port 110.

As noted above, the tee 80 is threadedly joined at one end to the nipple 78. The opposite end of the tee 80 may be connected to a source of air under pressure regulated at a remote point by an appropriate flow control valve (not shown). Similarly, the leg of the tee 80 may be connected to a source of oxygen under pressure regulated at a remote point by a second appropriate flow control valve (not shown). It will be appreciated that, by adjusting the respective flow control valves, the oxidizing gas which may be air, air enriched with oxygen, or oxygen alone, may be delivered at a range of flow rates to the burner mixing and combustion chamber through the annular opening 97. In like manner, gaseous fuel from a remote regulated source may be delivered at a range of flow rates to the mixing and combustion chamber through the tangential ports 98.

The combustile mixture of fuel and oxidizer may be ignited within the combustion chamber by the pilot burner 112 or other ignition sources. For complete combustion of natural gas comprising essentially methane, two moles of oxygen are required for each mole of methane to produce carbon dioxide and water in accordance with the formula:

$$CH_4 + 2O_2 \rightarrow CO_2 + 2H_2O$$

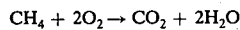

Where is it desired to produce to produce a reducing and non-decarburizing atmosphere, the oxygen may be reduced to one mole for each mole of methane. In this event, the combustion products will include carbon monoxide and hydrogen, both of which are active reducing agents.

The nature of the combustion process may be monitored visually through the peep sight 106 and the adjoining port 102. Continuous monitoring of the combustion process may be effected electronically by means of the ultraviolet detector 108 mounted adjacent port 102 and the output signal thereof used as a safety control signal to operate the remote fuel and oxidizer flow shut-off valves. Some control of the fuel and oxidizer mixing may be effected by varying the axial location of the burner disc 94 with respect to the fuel ports 98. As noted above, the surface of the burner disc 94 should be spaced from the center line of the fuel ports 98 by a distance appropriately equal to one-quarter the diameter of the mixing and cumbustion chamber.

Applicant has discovered that with the combination of a flat faced burner disc having a chamfered periphery located upstream from a tangential gaseous fuel supply, sufficient mixing of the reactants is obtained to cause reaction rates which produce flame temperatures in excess of 3200° F. adjacent the central axis of the combustion chamber and downstream from the face of the burner disc 94. The homogeneous mixing of the reactants and the high temperatures in the combustion region are effective to prevent carbonization in the combustion chamber and the furnace. The annular region 97 around the burner disc 94 for the ingress of the gaseous oxident simultaneously provides for continuous cooling of the burner disc 94 and the adjacent bore 77 of the refractory 76. Thus, the burner disc 94 and the refractory material 76 will not be damaged despite the high temperatures existing within the central regions of the burner combustion chamber. While the burner disc 94 as described is desirably formed from stainless steel for oxidation resistance at elevated temperatures, it may be formed from appropriate ceramic materials designed for high temperature uses.

The burner of the present invention produces a relatively long flame generally disposed about the central axis of the burner so that the large quantities of heat which are evolved do not result in localized regions where the temperatures are excessive.

Figure 5:
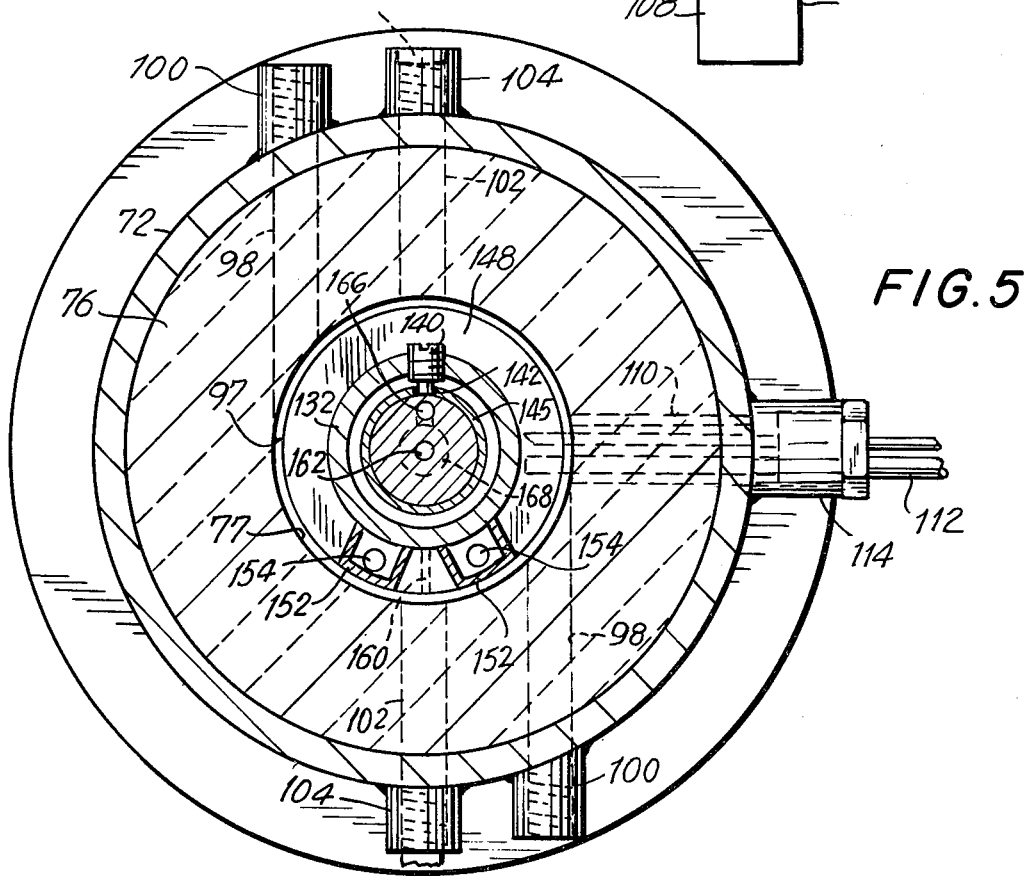
FIG. 5 is a sectional view taken along line 5—5 of FIG. 4.

Reference is now made to FIGS. 4 and 5 which illustrate a modified form of the present invention wherein the burner is adjusted to burn either a gaseous or a liquid fuel and the oxidizer may be air, enriched air, or oxygen. Parts common to the embodiments shown in FIGS. 2 and 4 are indicated by the same reference numerals. In FIG. 4, the portion of the burner adjacent the pipe section 72 including flanges 66 and 70 and pipe section 68 have been omitted. At the end of pipe section 72, a flange 74 is welded and a castable refractory 76 is formed within the weldment comprising flanges 66, 70 and 74 and pipe sections 68 and 72. The refractory 76 contains a central bore 77 concentric with the threaded portion of the flange 74 to define a mixing and combustion chamber.

Extending outwardly from the threaded flange 74 is a threaded coupling or nipple 116, the outboard end of which carries a tee 118. A first support plate 120 having a central aperture 122 and circumferential apertures 124 is positioned between the end of the coupling 116 and the body of the tee 118. A second support plate 120 having a central aperture 122 and circumferential apertures 124 is positioned in the opposite end of the tee 118 adjacent a hollow threaded plug 126. A guide tube 128 passes through the hollow plug 126 and the central aperture 122 of each support plate 120 and is affixed at one end to the hollow plug 126. The opposite end of the tube 128 is threadedly connected with an adjusting coupling 130 which is in turn joined to a burner disc support tube 132. The adjusting coupling 130 is formed with internal left and right hand threads on its respective ends which mate with corresponding left and right hand threads formed on the guide tube 128 and the burner disc support tube 132. A hollow burner disc 134 is fixed to the opposite end of the support tube 132. It will be appreciated that rotation of the adjusting coupling 130 will result in a change in the axial position of the face of the burner disc 134 with respect to the ports 98 and 102. Although a specific adjusting means has been described, it will be appreciated that various alternative means may be provided to adjust the relative location of the burner disc and the ports 98 and 102. The precise adjustment will depend upon the desired fuel-/oxidant ratio, the nature of the fuel and oxidant and the burner firing rate.

The burner disc 134 is provided with a concentric bore 136 adapted to receive a fuel oil atomizing nozzle which is located in the desired axial position relative to the face of the burner disc 134 by a set screw 140 threadedly connected with the support tube 132, one end of which passes through an aperture 142 and contacts the outside surface of the nozzle 138. The burner disc 134 comprises a plane annular face 144 integral with a tubular portion 145 and a swept-back peripheral flange 146. A washer 148 is welded to the outer edge of the flange 146 and the tubular portion 145 to define a coolant space 150 within the burner disc. A pair of ducts 152 communicate at one end with the coolant space 150 through orifices 154 in the washer 148 and, at the other end, with coolant supply ducts 156 through nipples 158 which pass through the wall of the support tube 132. A vane 160 is fitted radially within the coolant space 150 between the orifices 154 to define a single continuous passage comprising the coolant supply ducts 156, nipples 158, ducts 152, orifices 154 and the coolant space 150. A coolant, usually water, may thus be passed through the burner disc to provide additional cooling when desired.

The fuel atomizing nozzle 138 may be of any known type in which liquid fuel oil is atomized into small droplets and directed in an axial direction into the mixing and combustion chamber. In the present instance, air under pressure is directed from the duct 162 into the central mixing chamber 164 of the nozzle 138. Fuel oil is directed from the duct 166 into the central mixing chamber 164. The shearing action of the air breaks up the fuel to form a mixture of air and fuel oil droplets with the central mixing chamber 164. The mixture of air and fuel oil droplets exiting from the forward end of the mixing chamber is deflected against a pintle plate 168 and leaves the nozzle in a generally conical spray pattern through an annular orifice 170 formed by the pintle plate 168 and a flared or diverging portion 172 of the atomizing nozzle. While the diverging section 172 of the atomizing nozzle may have any desired angle, applicant has found that a 30° divergence angle produces the desirable elongated flame wherein the maximum temperatures are displaced from the refractory portions of the burner.

A second tee 174 is threadedly connected to the open leg of tee 118. The opposite ends 176, 178 of the tee 174 are connected by conduits (not shown) to sources of air and oxygen under pressure through appropriate flow control regulators (not shown) whereby a desired mixture of air and oxygen, or either of them separately, as an oxidizer may be delivered to the tee 118. The oxidizer passes through the apertures 124, the coupling 116 and the annular opening 97 into the mixing and combustion chamber.

The combustible mixture of fuel and oxidizer may be ignited by a pilot burner 112 or other ignition sources which extends into the combustion chamber through the port 110. While, as in the case of the embodiment shown in FIGS. 2 and 3, the oxidizer passing around the burner disc provides a degree of cooling when oil is used as fuel and oxygen as an oxidizer a more luminous flame is produced which is characterized by a high emissivity of radiant energy directed toward the burner disc. Additional cooling of the burner disc is thus required to prevent damage to the burner disc. It will be appreciated that the coolant supplied through the ducts 156 may be air, water or other gas or liquid. For convenience, the coolant will usually be water.

In some cases it may be desirable to preheat the oil prior to atomization in the atomizing nozzle 138. If this is desired, the duct 156 leading away from the burner disc 134 may be placed in heat exchange relation with the fuel oil duct 166 either within the burner assembly or exterior thereto or both to provide some of the requisite heat. Additional heat may be supplied from external sources. By preheating the oil the viscosity and therefore the flow characteristics will be improved. This results in improved atomization of the oil and better mixing of the oil and oxidant.

As with the embodiment shown in FIGS. 2 and 3, the combustion process may be observed through the peep sight 106 mounted in the coupling 104 and the port 102 and the process may be monitored electronically by means of the ultra violet detector 108 mounted in the opposite coupling 104 and port 102.

In a particular application, the most desirable fuel may be natural gas or methane. However, as the demand for natural gas had increased, the supply has not kept pace and frequently the use of natural gas for commercial purposes has been curtailed. It is, therefore, important for commercial users of gas to be able to shift from gas to oil and back again on short notice to meet the exigencies of the gas supply. The embodiment of the present invention illustrated in FIGS. 4 and 5 is particularly adapted to this end in that there is provision for the supply of either gaseous or liquid fuel. From the foregoing description it will be apparent to one skilled in the art that by manipulation of the appropriate valves the burner may be operated on either gaseous or liquid fuels alone or, if so desired, a mixture of both fuels. In the above detailed description, a burner body comprising basically a weldment has been disclosed. It will be appreciated that the burner body may also be formed from cast iron or other appropriate material.

The burners of the present invention may be used to generate process heat and an atmosphere high in hydrogen and carbon monoxide for use in scale-free forging, billet reheating, and ferrous and non-ferrous metal melting. If the exhaust gases are cooled slightly and passed through a carbon monoxide and water shift reactor, the atmosphere will then contain a considerable amount of hydrogen and carbon dioxide and a smaller amount of water. Further cooling of the exhaust gases and removal of the water and carbon dioxide will result in a protective atmosphere suitable for brazing, annealing and carburizing. Thus the burners of the present invention are very flexible in operation despite their simplicity.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. A burner comprising a substantially cylindrical refractory-lined mixing and combustion chamber having an open end, a burner disc positioned on the axis of said mixing and combustion chamber at the opposite end thereof and having a diameter smaller than the inside diameter of said mixing and combustion chamber and chamfered around the periphery thereof to define an annular oxidizer opening therebetween of increasing cross-sectional area toward the open end of said mixing and combustion chamber, at least one fuel port communicating with said mixing and combustion chamber, an ignition source port communicating with said mixing and combustion chamber and an ignition source located within said ignition source port.

2. A burner comprising a substantially cylindrical refractory-lined mixing and combustion chamber having an open end, a burner disc positioned on the axis of said mixing and combustion chamber at the opposite end thereof and having a diameter smaller than the inside diameter of said mixing and combustion chamber and chamfered around the periphery thereof to define an annular oxidizer opening therebetween of increasing cross-sectional area toward the open end of said mixing and combustion chamber, at least one gaseous fuel port located in a plane transverse to the axis of said mixing and combustion chamber substantially tangential to the inside surface thereof, an ignition source port communicating with said mixing and combustion chamber and an ignition source located within said ignition source port.

3. The burner described in claim 2 in which the face of the burner disc is axially displaced from the plane of the fuel port by a distance approximately one-fourth the inside diameter of the mixing and combustion chamber.

4. The burner described in claim 2 in which the axial location of the face of the burner disc is adjustable with relation to the plane of said fuel port.

5. A burner comprising a substantially cylindrical refractory-lined mixing and combustion chamber having an open end, a burner disc positioned on the axis of said mixing and combustion chamber at the opposite end thereof and having a diameter smaller than that of said mixing and combustion chamber and chamfered around the periphery thereof to define an annular oxidizer opening therebetween of increasing cross-sectional area toward the open end of said mixing and combustion chamber, a fuel atomizing nozzle located on the axis of said mixing and combustion chamber concentric with said burner disc, an ignition source port communicating with said mixing and combustion chamber and an ignition source located within said ignition source port.

6. The burner described in claim 5 in which the face of the burner disc is axially displaced from the plane of the location of the ignition source by a distance approximately one-fourth the inside diameter of the mixing and combustion chamber.

7. The burner described in claim 5 in which the axial location of the face of the burner disc is adjustable with relation to the location of said ignition source.

* * * * *